United States Patent [19]

Livesay

[11] 4,318,446
[45] Mar. 9, 1982

[54] LINEAR MOTION IMPACTOR DEVICE

[75] Inventor: Richard E. Livesay, Peoria, Ill.

[73] Assignee: Caterpillar Tractor Co., Peoria, Ill.

[21] Appl. No.: 949,588

[22] Filed: Oct. 10, 1978

[51] Int. Cl.$^3$ ............................................. B25D 11/10
[52] U.S. Cl. ...................................... 173/13; 173/119;
173/23; 173/DIG. 3; 74/55
[58] Field of Search ............ 74/49, 50, 570, 55;
173/13, 94, 95, 123, 119

[56] References Cited

U.S. PATENT DOCUMENTS

| | | |
|---|---|---|
| 1,015,732 | 1/1912 | Grice ................................. 173/123 X |
| 1,621,103 | 3/1927 | Brumell ................................. 173/122 |
| 1,634,623 | 7/1927 | Miller ................................. 173/13 |
| 1,718,425 | 6/1929 | Hilstad ............................. 173/119 X |
| 1,857,138 | 5/1932 | Campbell . | |
| 2,342,601 | 2/1944 | Pyle ................................. 173/123 X |
| 2,626,597 | 1/1953 | Lake . | |
| 2,710,137 | 6/1955 | Arnouil ................................. 74/49 X |
| 2,816,515 | 12/1957 | Senkowski et al. ................. 74/49 X |
| 3,023,628 | 3/1962 | Heppner ................................. 74/55 |
| 3,562,566 | 2/1971 | Kircher ................................. 74/55 X |
| 3,770,322 | 11/1973 | Cobb et al. . | |
| 3,868,145 | 2/1975 | Cobb et al. . | |
| 3,922,017 | 11/1975 | Cobb . | |
| 4,084,645 | 4/1978 | Salamone ................................. 173/13 |

FOREIGN PATENT DOCUMENTS

| | | | |
|---|---|---|---|
| 127758 | 11/1946 | Australia ............................. 173/123 |
| 769040 | 6/1934 | France ................................. 74/50 |

*Primary Examiner*—Robert Mackey
*Attorney, Agent, or Firm*—Phillips, Moore, Weissenberger, Lempio & Majestic

[57] ABSTRACT

A linear motion impactor device includes an impactor (28) which provides force to a hammer shank (56) only upon application of the hammer against a surface to be impacted thereby saving power and reducing noise during periods of non-use. The impactor (28) which operates on the hammer shank (56) is mounted in a housing (12) and is formed with a bore (30) normally coincident with the axis of rotation (22) of an eccentric cam (24) which is rotated by a power source (20). The impactor (28) is retained in this center-line position by a compression pad (38) positioned between the impactor (28) and the housing (12) and further positioned diametrically opposite the hammer shank (56). In the two embodiments described, either linear bearings (76, 78) or shear pads (42, 44) ensure linear motion to the impactor (28) during operation.

3 Claims, 4 Drawing Figures

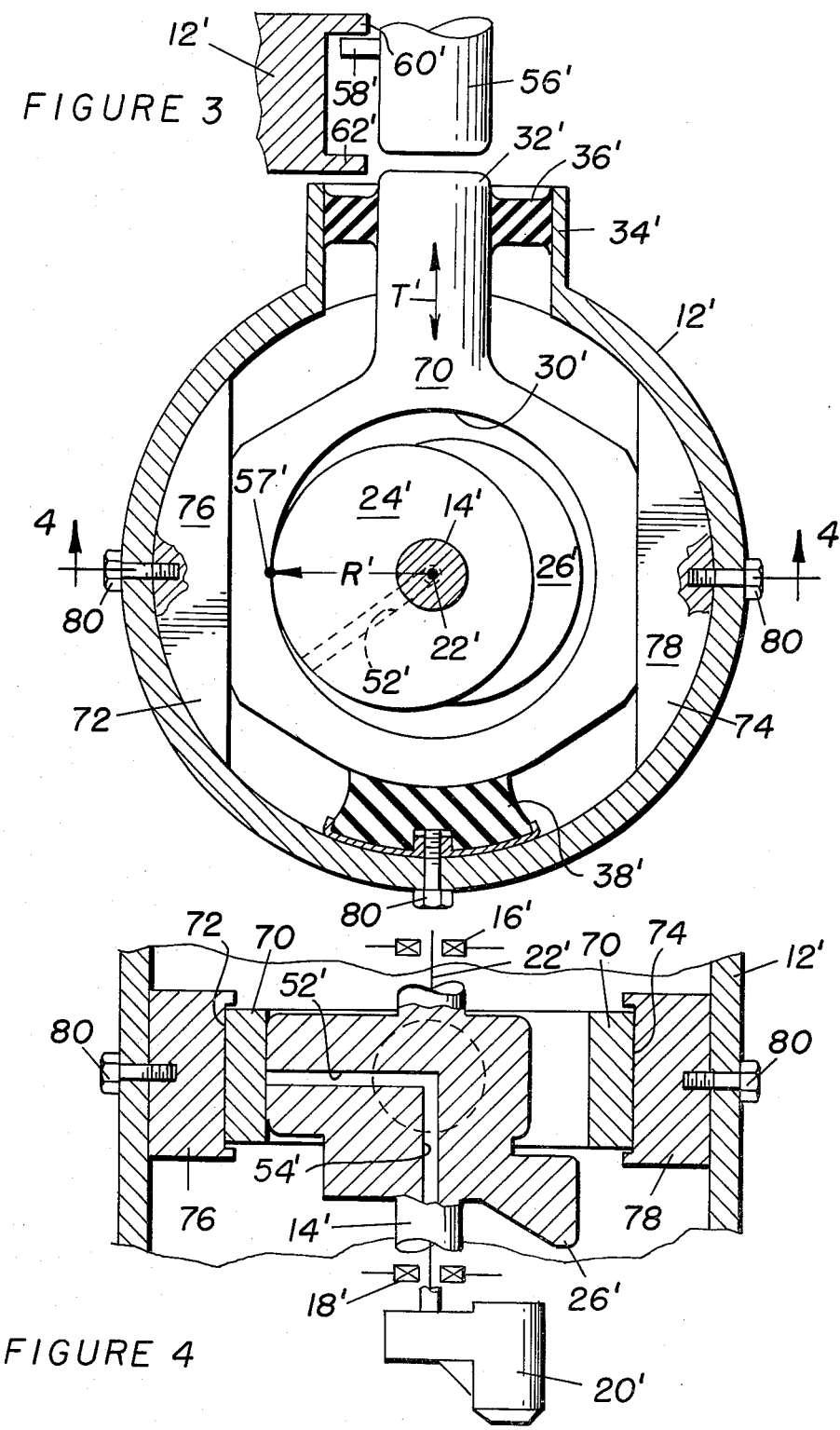

LINEAR MOTION IMPACTOR DEVICE

TECHNICAL FIELD

This invention relates to an impactor device. In particular, it relates to an impactor device which may be used in combination with rock breakers, crushers, pile drivers, compactors or the like. Specifically, the device provides high energy, for example, to break rock or the like.

BACKGROUND ART

In earlier impact tools such as that described in U.S. Pat. No. 3,770,322, issued to Cobb et al. on Nov. 6, 1973 and also in U.S. Pat. No. 3,922,017, issued to Cobb on Nov. 25, 1975, the reciprocated hammer is driven by an eccentric cam to which the impactor is journaled. In the manner described in these patents, energy is constantly utilized to reciprocate the hammer under load or no load conditions. As a result, power requirements are higher than necessary. Additionally, ambient noise from the impacting device is constant under load or no load conditions.

Eccentric impactors of the type described in the above patents generally provide non-linear motion to the impactor. Although the non-linear motion may be converted to linear motion at the hammer by various schemes, some energy is lost during the conversion process. Commonly, it has been found that a ball and socket type joint, similar to that described in U.S. Pat. No. 3,922,017, is satisfactory to convert the non-linear motion of the eccentric to linear motion at the hammer. Other schemes could include a pivoted arm arrangement or the like, such as disclosed in U.S. Pat. No. 3,770,322. In both these earlier schemes, a thrust bearing is required between the eccentric cam and the impactor portion of the device.

In eccentric driven impactor devices of the type described herein, it is usually necessary to seal the rotating eccentric or driving mechanism from the environment in which it operates. This is necessary because of the generally highly abrasive nature of the material being broken. This material usually is rock of some form or another and would certainly have detrimental effects on bearings and attendant components in the drive mechanism. Because of the reciprocating nature of the impactor operating on the hammer, a flexible seal is necessary between the drive chamber and the hammer. Fatigue in the flexible seal becomes a real problem and must be guarded against by both the manufacturer and the user. It is well known that fatigue in any member may be measured by the number of flexures of that member.

It is elementary that useful life may be lengthened by either increasing the available number of flexures in the material or decreasing the absolute number of flexures of the material. Materials suitable for flexible seals of the type envisioned herein are well developed and it is unlikely that a substantial increase in the mean time before failure will occur in such seals in the immediate future. Accordingly, the manufacturer of impacting devices is desirous of decreasing the number of flexures, particularly unnecessary flexures which occur during repositioning of the impactor device, notwithstanding efforts of the operator to shut-down the machine during such times. Further, it is appropriate to limit the degree of flexure by limiting deflection of the impactor to that necessary to accomplish the job.

In some conventional devices, the throw of the impactor is constant irregardless of the work to be accomplished. Control of the force applied to the hammer by the constantly reciprocating impactor is usually accomplished by positioning the hammer at varying distances from the impactor. Therefore, if a relatively light breaking force is appropriate, the hammer or other work member is positioned relatively further away from the impactor so that impact on the hammer for delivery to the workpiece is present only at the extreme throw of the eccentric. Nevertheless, full flexure of the case seal occurs on each blow of the impactor.

In another type of impactor drive mechanism, such as disclosed in U.S. Pat. No. 3,868,145, granted to Cobb et al. on Feb. 25, 1976, the impact member is an annular ring journaled on an eccentric shaft, so that the impact member contacts the hammer upon the orbital rotation of the ring on an eccentric shaft. In this particular type of drive mechanism, the impact ring is rotated either in a regular or an irregular pattern to prevent flattening of the faces of the impactor ring, thus necessitating a replacement or change. Rotation is accomplished in several ways, such as providing conical washers which rotate the impactor ring. Nevertheless, the resulting pattern formed by the ring upon rotation is non-linear. Thus, at the point of contact of the impact ring with the hammer, a "wiping" action may occur across the face of the hammer, resulting in unnecessary wear on the hammer and the impactor.

DISCLOSURE OF THE INVENTION

The present invention is directed to overcoming one or more of the problems as set forth above.

In one aspect of the present invention, an impact device compresses a shaft mounted for rotation in a mounting. The shaft defines an axis of rotation and has an eccentric portion defining a predetermined throw diameter. An impactor defines a bore having a diameter at least equal to the predetermined throw diameter of the eccentric portion of the shaft and is mountable in the mounting about the eccentric portion of the shaft so that the eccentric is free to rotate therein.

The present invention overcomes loss of power inherent in conventional eccentric driven impact devices while providing linear motion to the impactor. This linear motion eliminates "wiping" or "rolling" across the face of the hammer shank and further can lessen deflection of a case seal mounted about the impactor shank. The impactor, because of its bore having a diameter at least equal to the throw diameter of the eccentric portion of the shaft, is passive until an exterior load applied to the hammer laterally displaces the impactor in the mounting so that the impactor may then operate on the hammer with a counterforce.

BRIEF DESCRIPTION OF THE DRAWINGS

FIG. 3 is a plan view of a second embodiment of the same invention.

FIG. 4 is a sectional view taken at section line 4—4 of FIG. 3 of the embodiment depicted therein.

BEST MODE FOR CARRYING OUT THE INVENTION

Figure 1:
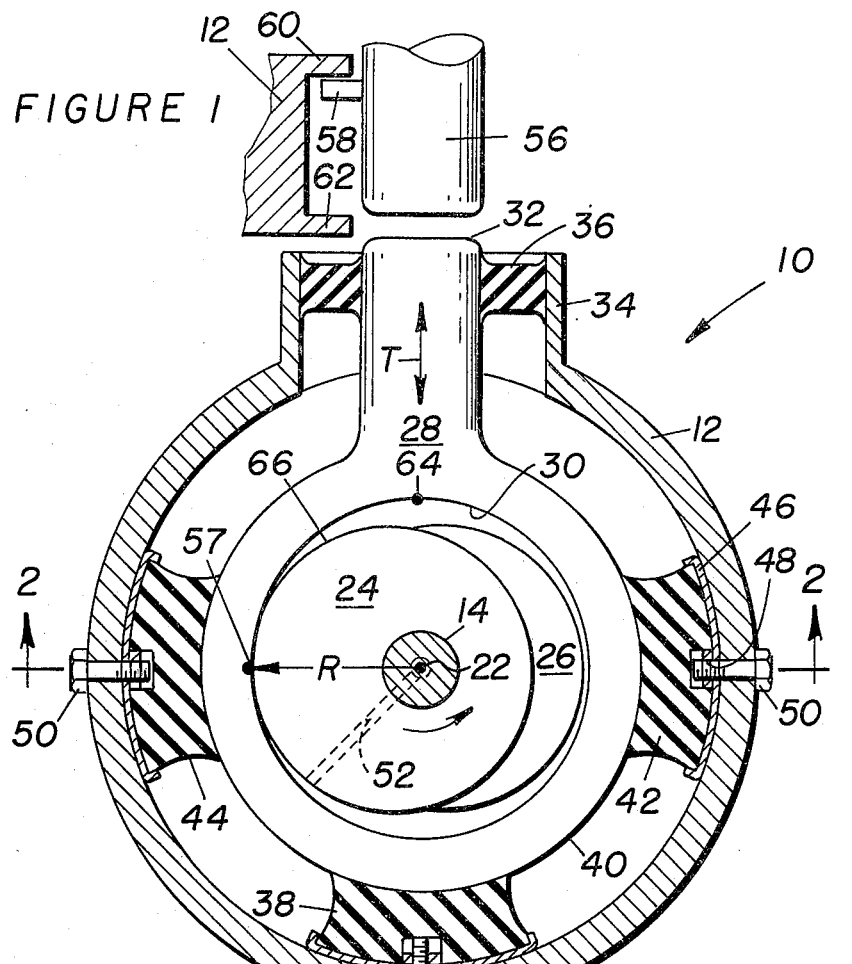
FIG. 1 is a plan view of one embodiment of the present invention.

Reference is made to FIG. 1 wherein an impact device 10 is depicted partly in section. Impact device 10 is comprised of a mounting or housing 12 in which a shaft 14 is journaled by appropriate means, such as a first bearing 16 and a second bearing 18, as shown schematically in FIG. 2.

Shaft 14 is rotated by appropriate means, such as a motor 20. Motor 20 may be powered by a hydraulic source or the like. Shaft 14 defines an axis of rotation 22.

Shaft 14 has affixed thereto by appropriate means well known in the art a cylindrical eccentric cam 24 which may be balanced by one or more counterweights 26, also mounted for rotation with shaft 14 in a manner well known in the art. Eccentric cam 24, when rotated by shaft 14, generates a circle having a radius R and a center coincident with the axis of rotation 22. This circle is hereinafter referred to as the throw diameter of eccentric cam 24.

Resiliently mounted in housing 12 about eccentric cam 24 is an impactor 28. Impactor 28 is generally in the form of an annular ring having an opening or bore defined therein by a cylindrical surface 30. The diameter of surface 30 is equal to at least twice the throw radius R of eccentric cam 24 and such diameter is preferably greater (1.2 to 1.5 times) than the outside diameter of cam 24. It should be understood that cam 24 could assume other shapes (e.g. elliptical, irregular) in accordance with well known design principles.

Impactor 28 has formed therewith an extension 32 which extends outwardly of housing 12 through a neck 34. Extension 32 is mounted in neck 34 by an elastomeric case seal 36. Affixed to housing 12 at a point generally displaced 180° circumferentially from neck 34 of impactor 28 is an elastomeric compression pad 38 which contacts the outer surface 40 of impactor 28. Athough an elastomeric pad is shown, other shock absorbing means such as springs would suffice to resiliently bias impactor 28 so that the bore defined by cylindrical surface 30 is coaxial with axis of rotation 22.

Referring specifically to FIG. 1, diametrically opposed shear pads 42 and 44 are also composed of an elastomeric material and are mounted between housing 12 and the outer surface 40 of impactor 28 substantially midway between compression pad 38 and extension 32 and on opposite sides of impactor 28. The compression pad 38 and the shear pads 42 and 44 may be each affixed to the housing 12 by a plate, such as a plate 46 bonded to the respective pad, and a threaded hole 48 or the like in which a bolt 50 may be engaged to affix the compression pad 38 or the shear pad such as shear pad 42 to the housing 12. A similar structure may be seen in FIG. 1 affixing shear pad 44 and compression pad 38 to housing 12.

Case seal 36 and compression pad 38 cooperate to retain impactor 28 centered on the axis of the throw diameter of eccentric cam 24, in the direction of arrows T in FIG. 1. Shear pads 42 and 44 maintain the linearity in the motion of impactor 28 when it is displaced by a force acting on a hammer shank 56.

Figure 2:
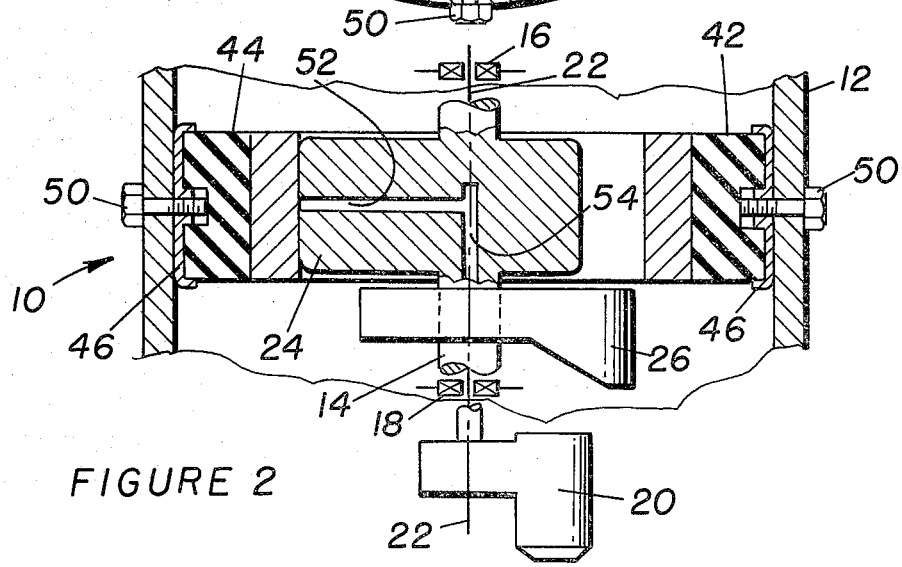
FIG. 2 is a sectional view taken at line 2—2 of FIG. 1 of the embodiment depicted in FIG. 1.

Referring now to FIG. 2, it can be seen that a passage 52 extends radially from an axial bore 54 formed in eccentric cam 24. Axial bore 54 is connected with the source of lubricating fluid (not shown) so that lubricating fluid may be passed under pressure to axial bore 54 and passage 52 to impinge upon inside surface 30 of impactor 28. The point of contact of lubricant should be less than 90° in advance of the point 57, the point of closest approach of eccentric cam 24 to inner surface 30 of impactor 28. Thus, oil or other lubricating fluid communicated through passage 52 lubricates the inside cylindrical surface 30 of impactor 28 to reduce wear as the point 57 rotates about inside surface 30 of impactor 28.

INDUSTRIAL APPLICABILITY

It is envisioned that the impact device embodying this invention may be utilized, for example, in a rock breaker such as described in U.S. Pat. No. 3,868,145. In particular, impactor 28 may be utilized to operate on a shank 56 of a hammer (not shown) which, in turn, may operate on rocks or other such materials. Shank 56 may be constrained for reciprocation between minimum and maximum throws by a portion of housing 12 or the like in a manner well known in the art. Illustrative of this is a tang 58 which may extend outwardly of shank 56 for reciprocation between bifurcated legs 60 and 62 of housing 12. A force applied to shank 56 to move the shank toward impactor 28 will cause the shank to contact impactor 28.

As a force applied to shank 56 increases, impactor 28 will move downwardly in FIG. 1 compressing compression pad 38 so that a point 64 on inside surface 30 of impactor 28 is located inside the throw radius of eccentric cam 24. As eccentric cam 24 rotates, the point 57 on the surface of eccentric cam 24, representing major radius R of the cam, will act on the inside surface 30 of impactor 28, thus forcing impactor 28 upwardly as indicated in FIG. 1 to act on shank 56 and, in turn, the hammer (not shown) of the rock breaker in which this particular device is envisioned as being used.

Concurrently, lubricating fluid (oil) is supplied through passages 54 and 52 to impinge on inside surface 30. This constant flow of lubricant provides an oil film at all times between the contacting metal surfaces to retard wear thereof. It should be noted that the condition shown in FIG. 1 is the steady state, that is, without a force imposed on shank 56. It can be seen that impactor 28 is held in a position so that the center of the circle formed by inside surface 30 is substantially coincident with the axis of rotation 22 of eccentric cam 24. Thus, in the normal steady state condition, no impact force is applied to shank 56, nor will any impact force be applied to shank 56 until an opposite force is applied thereto.

The result of this invention is a substantial savings in power in the impactor device in that no power is expended on shank 56 until the actual work begins. Thus, power expended during the steady state and no impact condition illustrated in FIG. 1 is only sufficient to rotate eccentric cam 52 and a counterweight 26. Rotation of these devices is appropriate during the steady state operation in order to maintain the inertia of the device. During operation, the shear pads 42 and 44 act on the impactor 28 so that motion of the impactor 28 is substantially linear. In prior art devices, since the inside surface, corresponding to surface 30, of the impactor was coincident with and journaled on the cam surface corresponding to surface 66 by a thrust bearing, the resulting motion of the impactor was non-linear. The linear motion provided by the present device reduces wear on the case seal 36 and further reduces wear on the bearing surfaces between shank 56 and impactor 28 by eliminating the wiping action found in the conventional impactor device. Furthermore, no thrust bearing is necessary between the impactor 28 and the eccentric cam 24.

AN ALTERNATE MODE FOR CARRYING OUT THE INVENTION

Referring to FIGS. 3 and 4, an alternate mode or embodiment is shown for carrying out this invention. In this alternate mode, like parts are indicated by the same numerals as used in the primary embodiment with the addition of a prime symbol ('). In FIG. 3, an impactor 70 is formed with two parallel sides or faces 72 and 74 which are aligned substantially with the axis of reciprocation of the impactor. Faces 72 and 74 are formed to bear against parallel sides or linear bearings 76 and 78 which are affixed to a housing 12' by appropriate fastening means, such as bolts 80.

As in the first described embodiment, a compression pad 38' and a case seal 36' cooperate to retain the impactor 70 in a position so that an eccentric cam 24' may rotate freely with an inner cylindrical surface 30' of impactor 70. Once impactor 70 is moved downwardly as indicated in FIG. 3, the eccentric cam 24' will act against the inner surface 30' to impart reciprocal motion to impactor 70 and thus shank 56' as in the embodiment of FIGS. 1 and 2.

INDUSTRIAL APPLICABILITY OF THE ALTERNATE EMBODIMENT

The industrial applicability of the alternate embodiment of FIGS. 3 and 4 corresponds to that of the FIGS. 1 and 2 embodiment. Specifically, this impact device may be used on a rock breaker type machine and overcome power losses and provide the other operational desiderata discussed above in comparison to prior art devices of similar application.

In both embodiments, it should be apparent to those skilled in the art that the tool which has been described as being associated with shank 56(56') could be affixed directly to impactor 28(70).

Other aspects, objects and advantages of this invention can be obtained from a study of the drawings, the disclosure and appended claims.

What I claim is:

1. An impact tool comprising:
    a housing (12),
    a shaft (14) mounted for rotation in said housing (12), said shaft (14) defining an axis of rotation (22), said shaft further having an eccentric cam (24) thereon defining a predetermined fixed radius (R), said throw radius (R) being coaxial with said axis of rotation (22);
    an impactor (28) defining a circular bore (30) therein having a diameter at least equal to twice said predetermined throw radius (R), said impactor (28) including an extension (32) extending outwardly of the housing;
    means (20) for rotating said shaft;
    a resilient case seal (36) associating the extension with the housing and a compression pad (38) substantially opposite the extension (32) interposed between the impactor (28) and the housing (12) so that the case seal (36) and the compression pad (38) resiliently bias said impactor (28) about the eccentric cam (24); and
    at least two elastomeric shear pads (42,44), each interposed between the impactor (28) and the housing (12), each shear pad (42,44) positioned on generally opposite sides of said impactor (28).

2. The impact tool of claim 1 wherein the shaft (14,14') and the eccentric cam (24,24') define lubrication passage means (52, 54;52',54') for providing lubricant to the inner cylindrical surface of the impactor bore (30,30').

3. The impact tool of claim 2 wherein the lubrication passage means (52,54;52',54') is formed to direct fluid against said inner cylindrical surface at a point less than 90° in advance of the point of closest approach (57,57') of eccentric cam (24,24') and inner cylindrical surface.

* * * * *